(12) United States Patent
Ohara et al.

(10) Patent No.: US 7,803,341 B2
(45) Date of Patent: Sep. 28, 2010

(54) FINE DRY SILICA PARTICLES

(75) Inventors: Masakazu Ohara, Shunan (JP); Yukihiro Takata, Shunan (JP); Hiroo Aoki, Shunan (JP); Masahide Ueda, Shunan (JP)

(73) Assignee: Tokuyama Corporation, Shunan-shi (JP)

( * ) Notice: Subject to any disclaimer, the term of this patent is extended or adjusted under 35 U.S.C. 154(b) by 0 days.

(21) Appl. No.: 12/303,535

(22) PCT Filed: May 22, 2007

(86) PCT No.: PCT/JP2007/060757

§ 371 (c)(1), (2), (4) Date: Dec. 4, 2008

(87) PCT Pub. No.: WO2007/142047

PCT Pub. Date: Dec. 13, 2007

(65) Prior Publication Data

US 2009/0253851 A1     Oct. 8, 2009

(30) Foreign Application Priority Data

Jun. 9, 2006 (JP) ............... 2006-161592
Jun. 16, 2006 (JP) ............... 2006-168133

(51) Int. Cl.
*C01B 33/12* (2006.01)
(52) U.S. Cl. ................... 423/335; 423/333
(58) Field of Classification Search .......... 423/335, 423/333
See application file for complete search history.

(56) References Cited

U.S. PATENT DOCUMENTS

| 4,705,762 | A | 11/1987 | Ota et al. |
| 6,203,960 | B1 | 3/2001 | Ciccarelli et al. |
| 6,551,567 | B2 | 4/2003 | Konya et al. |
| 7,083,770 | B2 | 8/2006 | Shibasaki et al. |
| 7,615,201 | B2 * | 11/2009 | Konya et al. ............ 423/337 |
| 2001/0046635 | A1 * | 11/2001 | Srinivasan et al. ....... 430/108.3 |
| 2003/0152506 | A1 * | 8/2003 | Shibasaki et al. ........... 423/335 |

FOREIGN PATENT DOCUMENTS

| JP | 60-255602 A | 12/1985 |
| JP | 01-161065 A | 6/1989 |
| JP | 04-021515 A | 1/1992 |
| JP | 2002-003213 A | 1/2002 |
| JP | 2002-060214 A | 2/2002 |
| JP | 2002-114510 A | 4/2002 |
| JP | 2002-116575 A | 4/2002 |
| JP | 2003-137533 A | 5/2003 |
| JP | 2005-119929 A | 5/2005 |

OTHER PUBLICATIONS

Yoshio Mitani et al., Journal of the Ceramic Society of Japan, 1993. 6, vol. 101, No. 6, pp. 707-712.

* cited by examiner

*Primary Examiner*—Timothy C Vanoy
*Assistant Examiner*—Michelle Hou
(74) *Attorney, Agent, or Firm*—Birch, Stewart, Kolasch & Birch, LLP

(57) ABSTRACT

Fine dry silica particles are produced by combustion by using a burner of a multiple-pipe structure, feeding a mixed gas of a gas of a siloxane compound without containing halogen in the molecules thereof and an oxygen gas at a ratio of 0.3 to 1.5 into the center pipe of a burner, and feeding a combustible gas into the first annular pipe on the outer side of the center pipe of the burner. The fine dry silica particles has a BET specific surface area of 20 to 55 $m^2/g$, and wherein the water suspension containing the fine silica particles at a concentration of 1.5% by weight has an optical absorbance $\tau$ for the light of a wavelength of 700 nm satisfying the following formula (1):

$$\tau \leq 240 S^{-1.4-0.07} \quad (1)$$

wherein S is the BET specific surface area ($m^2/g$) of the fine dry silica particles.

The fine dry silica particles do not almost contain coarse particles or aggregated particles, have a sharpe grain size distribution, excellently disperse in the resins, suppress a rise in the viscosity when highly filled, and impart sufficiently large strength to the resin compound.

11 Claims, 1 Drawing Sheet

FINE DRY SILICA PARTICLES

FIELD OF THE INVENTION

The present invention relates to fine dry silica particles that can be favorably used as a filler for a resin compound which is used as a molding compound for semiconductor devices, as a sealing material for liquid crystals or as an insulating material for laminated circuit boards, or that can be favorably used as a toner additive for electrophotography.

BACKGROUND ART

In recent years, semiconductor chips are generating heat in increased amounts accompanying the trend toward higher degree of integration and higher operation speed of semiconductor chips, causing an increase in the occurrence of defects stemming from the discrepancy of thermal expansion between the semiconductor chip and the molding compound for sealing it or a circuit board (particularly, laminated circuit board) mounting the semiconductor chip thereon. This tendency is requiring an increase in the amount of the filler added to the molding compound for semiconductor chips or added to the resin used for forming the insulating layer of the laminated board. Addition of the filler in an increased amount enables the generated heat to be efficiently radiated and, further, lowers the coefficient of thermal expansion so as to approach the coefficient of thermal expansion of the semiconductor chips. For the resin compounds used for sealing liquid crystal displays, too, it has been desired to add the filler in an increased amount in order to improve the reliability for sealing the liquid crystal displays.

As a filler used for a molding compound for semiconductor devices, there have been known fine dry silica particles such as fumed silica (usually called dry silica) prepared by the flame hydrolysis of chlorosilane (see patent document 1).

The fumed silica works to impart a high degree of viscosity even if it is added in small amounts to the resin in a liquid state (molten-state or solution-state). If added in an increased amount, therefore, it becomes difficult to form the resin (resin composition). Namely, limitation is imposed on the amount of using the fumed silica.

Further, the fumed silica contains, as an impurity, chlorine that stems from the chlorosilane which is the starting material and brings about a defect of corroding metal wiring and the like.

In order to make it possible to add the fumed silica in large amounts avoiding its effect of highly imparting the viscosity, it can be contrived to use spherical silica having an average particle size of about 1 μm as a filler. In this case, the filling rate of the filler can be surely increased while suppressing a rise in the viscosity of the resin. However, the spherical silica not only much contains coarse particles of several microns or larger stemming from the production method but also exhibits strong aggregating property and much contains aggregated particles which cannot be easily dispersed in the resin. As a result, the resin compound to which the spherical silica is much added exhibits poor gap permeability, clogs among the wirings, and deteriorates the reliability of equipment to which the resin compound is applied.

Further, the resin compound for semiconductor devices must have decreased local dispersion in the coefficient of thermal expansion in order to improve reliability of the electronic equipment which uses the semiconductor sealing material. However, the filler material having a broad particle size distribution disperses unhomogeneously in the resin composition, developing local dispersion in the coefficient of thermal expansion and forming portions where the coefficient of thermal expansion greatly differs.

Further, the above-mentioned fumed silica is used as an external additive for toner used in the electrophotography such as a copier or a laser printer in order to impart fluidity or to control the amount of electric charge of the toner (see patent document 2).

Toner resin particles of a small diameter have been used and, besides, a toner resin having a low softening temperature has been used in the modern electrophotography featuring finer pictures, higher picture quality and high speed. Therefore, the toner particles tend to melt-adhere together lowering the fluidity thereof. Accordingly, the toner additive for covering the surfaces of the toner particles must have the effect for imparting fluidity as well as the anti-blocking effect more than ever before.

However, the fine fumed silica particles used as the toner additive have a branched structure in which the primary particles are melt-adhered, exhibit a less effect for imparting fluidity than the individual spherical particles and, further, have a small primary particle size allowing silica particles to sink below the surfaces of the toner resin particles due to external stress such as stirring, without playing the role of antiblocking for extended periods of time, allowing the fluidity of the toner to gradually decrease, making it difficult to scratch off the residual toner by the cleaning blade and causing inconveniences such as a decreased transfer efficiency at the time of forming the picture and a decreased picture equality due to filming phenomenon. In this case, the above-mentioned inconveniences can be avoided by using an external additive having a large particle size. However, a too large particle size decreases the effect for improving the fluidity. Therefore, sinking in the toner resin particles is not prevented even if there is used a toner additive having too large particle sizes. Further, the toner additive containing hard and coarse particles of not smaller than several microns becomes a cause of impairing the durability of the photosensitive material drum due to abrasion.

Further, the toner additive must have a function for controlling the electric charge of the toner particles. However, the toner additive having a broad particle size distribution disperses or adheres unhomogeneously arousing a problem in controlling the electric charge and causing a decrease in the picture quality. Even when metals such as iron and sodium, as well as chlorine are contained as impurities, the amount of electric charge decreases and it becomes difficult to control the electric charge.

In order to overcome the problems in the above resin filler and in the toner additive, the fine silica particles used for the above applications must have the following properties.
(a) Do not contain coarse particles of several microns or larger.
(b) Have a sharp particle size distribution.
(c) Contain little impurities such as chlorine.

Generally, the following five methods have been known for producing fine silica particles.
(1) Sol-gel method (see patent document 3).
(2) Flame hydrolysis of chlorosilane (see patent document 4).
(3) Combustion of silicon powder (see patent document 5).
(4) Spray combustion of a liquid siloxane without containing halogen in the molecules thereof (see patent document 6).
(5) Diffusion combustion of siloxane gas without containing halogen in the molecules thereof (see patent document 7).

In the case of the sol-gel method of (1) above, so-called mono-dispersed particles are obtained enabling the particle size and the particle size distribution thereof to be easily controlled. However, the particles aggregate firmly in the steps of drying and firing for removing water contained in the silica arousing a problem of formation of coarse particles.

In the case of the flame hydrolysis of chlorosilane of (2) above, a chlorine compound is by-produced and is adsorbed by silica that is formed accounting for the residence of chlorine in an amount of about several tens of ppm. Besides, the flame temperature is low due to the use of chlorosilane as the starting material and the region becomes small where the formed particles collide and grow together. As a result, fine silica particles do not collide together to grow and it becomes difficult to obtain silica particles of a size adapted to the use as a filler. Even if particles were obtained having desired sizes, there are much contained poorly dispersing particles stemming from the melt-adhesion of primary particles.

In the case of the combustion of the silicon powder of (3), an advantage is that no halogen compound is contained in the starting material. To control the average particle size of the obtained silica, however, it becomes necessary to control the silicon concentration of the starting material in the flame, and feeding the starting material maintaining stability is a prerequisite. However, since the starting material (silicon powder) is a solid powder, it is difficult to feed the starting material at a constant rate maintaining stability though the feeding rate can be increased. Due to fluctuation in the feed of the starting material, therefore, the concentration of silica source varies in the flame and it becomes difficult to obtain fine silica particles having a sharp particle size distribution without containing coarse particles. Further, even if the starting material can be fed maintaining stability, the particle size distribution stemming from the starting powder tends to vary or the concentration tends to vary due to the deviation of the starting material in the flame making it difficult to obtain fine silica particles having a sharp particle size distribution without containing coarse particles.

In the case of the spray combustion of (4), the starting material that is used is a liquid (liquid siloxane) and can be easily fed maintaining stability accompanied, however, by the difficulty in adjusting the droplets that are sprayed to possess a predetermined size. Besides, the liquid droplets may be present in some places but may not be present in other places causing a difference in the concentration of silica source in the flame and making it difficult to obtain fine silica particles having a sharp particle size distribution without containing coarse particles.

Therefore, the methods (1) to (4) are not adapted to obtaining silica particles having the above-mentioned properties (a) to (c). According to the diffused combustion of (5), the siloxane without containing halogen in the molecules thereof is gasified and is quantitatively fed into a burner to form silica in the flame. The method (5), usually, employs means for burning the siloxane by introducing a siloxane gas into the burner together with a carrier gas such as nitrogen, and diffuse-mixing a combustion-sustaining gas (oxygen, air, external air, etc.) separately introduced into the burner therewith at the outlet of the burner.

According to the above diffusion combustion method, the mixed state of the siloxane gas and the combustion-sustaining gas greatly affects the state of combustion of the siloxane or the formation and growth of the fine silica particles making it, however, very difficult to control the mixing of the gases in a diffused state and, therefore, difficult to control the particle size distribution of the obtained fine silica particles. Further, without separately introducing oxygen in an excess amount into the burner, the siloxane does not burn completely, carbon soot forms, and fine silica particles are not obtained.

As a method of controlling the state of mixing the siloxane gas and the combustion-sustaining gas yet solving the problem of incomplete combustion, the present inventors have proposed a method of burning the siloxane gas by mixing the siloxane and the combustion-sustaining gas together in advance and by introducing the mixed gas into the burner as described in a patent document 7. This method surely prevents the incomplete combustion of the siloxane. However, no method has yet been known to control properties such as particle size distribution of the obtained fine silica particles, and the silica particles having the above properties (a) to (c) have not yet been obtained.

When the fine silica particles include coarse particles, it can be contrived to remove the coarse particles by the classifying operation. However, no technology is yet available for removing particles of about 3 to 5 μm by dry classification method such as cyclone or pneumatic classification. Therefore, the fine silica particles must be classified by the wet method such as wet sieving or classification by hydraulic elutriation. These means, however, require the step of drying fine particles causing the particles to be strongly aggregated together at the time of drying and rather forming coarse particles. After all, there is at present no method of controlling the fine silica particles for their particle size distribution relying upon the classification.

Patent document 1: JP-A-1-161065
Patent document 2: JP-A-2002-116575
Patent document 3: JP-A-4-21515
Patent document 4: JP-A-2002-3213
Patent document 5: JP-A-60-255602
Patent document 6: JP-A-2002-60214
Patent document 7: JP-A-2002-114510

DISCLOSURE OF THE INVENTION

It is therefore an object of the present invention to provide fine dry silica particles that excellently disperse in a resin, that suppress a rise in the viscosity when highly filled in the resin, and that are capable of imparting a sufficiently large strength to the resin, and a method of producing the same.

Another object of the present invention is to provide fine dry silica particles which, when blended in the resin, work to prevent a decrease in the gap permeation of the resin and prevent clogging among the wirings that stem from coarse particles or aggregated particles of sizes of several microns or larger, and do not lower the reliability of equipment to which the resin is applied, and a method of producing the same.

A further object of the present invention is to provide fine dry silica particles which, when used as a toner additive for electrophotography, exhibit effect for excellently imparting fluidity and maintain favorable fluidity suppressing the sinking in the toner resin particles even after used for extended periods of time, and a method of producing the same.

In order to solve the above technical problems, the present inventors have conducted keen study concerning a relationship between the conditions for burning a siloxane compound without containing halogen in the molecules thereof and properties of a filler of fine dry silica particles for the resin and of a toner additive. As a result, the inventors have succeeded in obtaining fine dry silica particles that have achieved the above objects by adjusting the conditions for burning the siloxane compound to lie in a particular range, and have completed the present invention.

According to the present invention, there is provided fine dry silica particles obtained by an inter-flame reaction of a siloxane compound without containing halogen in the molecules thereof, and having a BET specific surface area of 20 to 55 $m^2/g$, wherein the water suspension containing the fine silica particles at a concentration of 1.5% by weight has an optical absorbance τ for light of a wavelength of 700 nm satisfying the following formula (1):

$$\tau \leq 240 S^{-1.4} - 0.07 \quad (1)$$

wherein S is the BET specific surface area (m²/g) of the fine dry silica particles.

In the fine dry silica particles of the present invention, it is desired that:

(1) The residual amount of the fine silica particles on a sieve is not larger than 10 ppm relying on a wet sieving method using an electroformed sieve having a perforation size of 5 μm;

(2) The residual amount of the fine silica particles on a sieve is not larger than 10 ppm relying on the wet sieving method using the electroformed sieve having a perforation size of 3 μm;

(3) The iron content is less than 20 ppm, aluminum content is less than 5 ppm, nickel content is less than 5 ppm, chromium content is less than 5 ppm, sodium content is less than 3 ppm and chlorine content is less than 3 ppm;

(4) The surfaces are treated by using at least one kind of treating agent selected from the group consisting of silylating agent, silicone oil, siloxanes, metal alkoxide, fatty acid and metal salts thereof;

(5) The surfaces are treated by using at least one kind of silylating agent selected from the group consisting of γ-methacryloxypropyltrimethoxysilane, γ-glycidoxypropyltrimethoxysilane, γ-glycidoxypropylmethyldimethoxysilane, γ-mercaptopropyltrimethoxysilane, γ-aminopropyltrimethoxysilane, γ-aminopropyltriethoxysilane, γ-(2-aminoethyl)aminopropyltrimethoxysilane, and γ-(2-aminoethyl)aminopropylmethyldimethoxysilane.

According to the present invention, there is further provided a method of producing fine dry silica particles by combustion by using a burner of a multiple-pipe structure having a center pipe and a surrounding first annular pipe, feeding a mixed gas of a gas of a siloxane compound without containing halogen in the molecules thereof and an oxygen gas into the center pipe of the burner, and feeding an auxiliary fuel gas containing a hydrogen gas or a hydrocarbon gas as a combustible component to the first annular pipe of the burner, wherein the mixed gas contains the gas of the siloxane compound and the oxygen gas at an oxygen ratio $R_o$ defined by the following formula (2), $$R_o = A/B \quad (2)$$

wherein A is the amount of oxygen in the mixed gas, and B is the amount of oxygen necessary for completely burning the siloxane compound in the mixed gas, of 0.3 to 1.5, and the auxiliary fuel gas is so fed that the auxiliary fuel ratio $R_{SFL}$ defined by the following formula (3), $$R_{SFL} = C/B' \quad (3)$$

wherein C is the amount of oxygen necessary for completely burning the combustible component in the auxiliary fuel gas flowing out of the first annular pipe, and B' is the amount of oxygen necessary for completely burning the siloxane compound in the mixed gas flowing out of the center pipe, is 0.003 to 0.3.

In the production method of the present invention, it is desired that:

(1) The burner has a triple-pipe structure having a second annular pipe surrounding the outer circumference of the first annular pipe, and an oxygen gas is fed as a combustion-sustaining gas into the second annular pipe;

(2) The combustion-sustaining gas is so fed that the combustion-sustaining oxygen ratio $R_{cmbts}$ defined by the following formula (4), $$R_{cmbts} = D/B' \quad (4)$$

wherein D is the amount of oxygen flowing out of the second annular pipe, and B' is as defined above, is 0.1 to 2.0;

(3) The mixed gas contains the gas of the siloxane compound and the oxygen gas at such a ratio that the oxygen ratio $R_o$ is 1.0 to 1.5;

(4) Hydrogen is used as the auxiliary fuel gas; and (5) The siloxane compound that is used has a boiling point of 100 to 250° C.

The present invention further provides a resin composition containing the above fine dry silica particles, and a toner additive for the electrophotography, comprising the fine dry silica particles.

The fine dry silica particles of the present invention excellently disperse in the resin, suppress a rise in the viscosity when dispersed and blended in large amounts in, for example, the resin, and impart a sufficiently large strength to the resin compound. Besides, the fine silica particles contain neither coarse particles nor aggregated particles. As a result, the resin compound blended with the fine silica particles exhibits a favorable gap permeability without causing clogging among the wirings, and without deteriorating the reliability of equipment to which the resin compound is applied.

The fine dry silica particles of the present invention are useful as a filler for resins, and a resin compound blended with the fine dry silica particles is very useful for such uses as sealing semiconductors, sealing liquid crystal displays and insulating laminated circuit boards.

Even when mixed with the toner resin particles by dry-mixing which is means producing a weak dispersing force, the fine dry silica particles of the present invention quickly disperse on the surfaces of the toner resin particles exhibiting an effect of excellently imparting fluidity at an early time without sinking in the toner resin particles even after used for extended periods of time. Therefore, the fine dry silica particles of the invention impart excellent fluidity to the toner particles over extended periods of time. The fine dry silica particles of the invention further have particle sizes adapted to preventing the filming phenomenon that results from a defective scratch off thereof by the cleaning blade, have sharp particle size profile, suppress dispersion in the amount of charge of the toner, and effectively suppress a decrease in the durability of the photosensitive material drum caused by abrasion.

Therefore, the fine dry silica particles of the present invention are also very useful as a toner additive for electrophotography.

BEST MODE FOR CARRYING OUT THE INVENTION

<Fine Dry Silica Particles>

Figure 1:
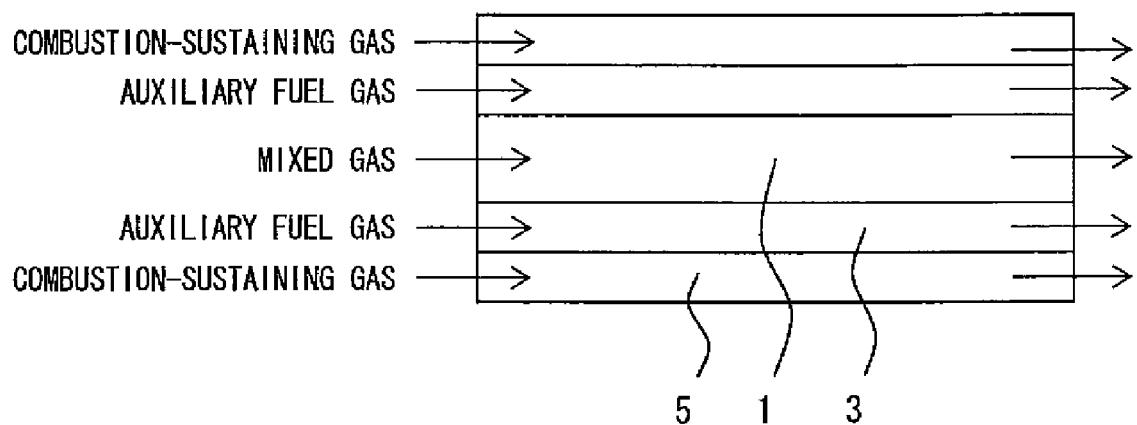
FIG. 1 is a view schematically illustrating the sectional structure of a burner favorably used for producing fine dry silica particles of the present invention.

The fine dry silica particles of the present invention have a BET specific surface area in a range of 20 to 55 m²/g and, particularly, 30 to 0 m²/g. That is, if the fine dry silica particles having a specific surface area in excess of 55 m²/g are added to the resin in amounts necessary for imparting efficient heat-radiating property or for bringing the coefficient of thermal expansion close to that of the semiconductor element, the viscosity rises conspicuously making it difficult to achieve the object of the present invention which is to suppress the rise of viscosity. If the fine dry silica particles having a specific surface area smaller than 20 m²/g are added to the resin to cure the resin, the fine silica particles that interact with the resin have such small surface areas that a sufficient degree of strength is not imparted to the cured product that is obtained.

When the fine dry silica particles of the invention are dispersed in water at a concentration of 1.5% by weight to prepare a suspension thereof, it is very important that the optical absorbance $\tau$ of the suspension for light of a wavelength of 700 nm satisfies the following formula (1), $$\tau \leq 240 S^{-1.4} - 0.07 \quad (1)$$

wherein S is a BET specific surface area (m²/g) of the fine dry silica particles.

In general, the absorbance $\tau$ decreases with a decrease in the primary particle size of the silica in the aqueous suspension, i.e., as the specific surface area of the silica becomes high. The absorbance $\tau$, however, increases when as fumed silica, the primary particles in a number of several to several tens are relatively strongly bonded together to form a mass (secondary particle) which is further bonded to other secondary particles forming an aggregated structure. Therefore, the silica having a small absorbency $\tau$ despite of having the same specific surface area means that it has primary particles which are of small sizes without being melt-adhered together to form secondary particles but in which the primary particles of small sizes are present independently. This further means that the particles have not been aggregated, are not containing coarse particles, and the primary particles have a narrow particle size distribution (sharp particle size distribution). That is, when compared on the basis of the same specific surface area, it can be said that the fine silica particles having a small absorbance $\tau$ are the silica particles which substantially disperse well in the resin.

The fine dry silica particles of the present invention have the specific surface area exhibiting properties as described above and, at the same time, have the absorbance $\tau$ satisfying the conditions of the formula (1). Therefore, the fine dry silica particles of the present invention do not almost contain secondary particles stemming from the adhesion of the primary particles, do not have an aggregated structure, do not contain coarse particles, but have a sharp particle size distribution. Having the above properties, the fine dry silica particles disperse very favorably in the resins and in the toner particles. The method of measuring the absorbance $\tau$ will be described later in the Example.

In the present invention, when the value of absorbance $\tau$ does not satisfy the condition of the formula (1), the silica particles disperse poorly in the resin, and the resin composition exhibits unhomogeneous coefficient of thermal expansion. Further, the particle size distribution becomes broad and when the fine silica particles are dispersed in the resin, the resin compound exhibits poor gap permeability and causes clogging among the wirings. Moreover, the fine silica particles poorly disperse in the toner particles, do not exhibit the effect of imparting fluidity to the toner particles at an early time, unhomogeneously adhere to the toner particles or impart unhomogeneous charge to the toner particles. When the pictures are consecutively formed by the electrophotographic method, therefore, the pictures tend to be deteriorated developing fringes, fogging and oozing.

It is further desired that the residual amount of the fine dry silica particles on a sieve is not larger than 10 ppm relying on a wet sieving method using an electroformed sieve having a perforation size of 3 μm. If the residual amount on the sieve exceeds 10 ppm relying on the wet sieving method using the electroformed sieve having the above perforation size, the gap permeability of the resin compound becomes poor due to coarse particles, and clogging tend to occur among the wirings deteriorating the reliability of devices to which the resin compound is applied. Further, the abrasion becomes conspicuous due to coarse particles. When the silicon particles are used as a toner external additive therefore, durability of the photosensitive material drum decreases due to the abrasion or properties of the photosensitive material drum decrease causing a decrease in the picture quality.

Determination of the content of coarse particles will be described later which, however, must be conducted relying upon the wet sieving method using an electroformed sieve. As another method, it can be contrived to measure the particle size distribution based on the laser diffraction/scattering method of which the detection sensitivity, however, is as very poor as on a level of several percent, and is not suited for measuring the particle size distribution of the fine silica particles of the present invention.

It is further desired that the fine dry silica particles of the present invention has the iron content of less than 20 ppm, aluminum content of less than 5 ppm, nickel content of less than 5 ppm, chromium content of less than 5 ppm, sodium content of less than 3 ppm and chlorine content of less than 3 ppm from the standpoint of decreasing short-circuiting among the metal wirings or decreasing corrosion of the metal wirings stemming from the fine silica particles and, further, from the standpoint of maintaining electric charge of the toner particles when used as a toner additive.

<Production of Fine Dry Silica Particles>

The above-mentioned fine dry silica particles of the present invention are produced by using a burner having a multiple-pipe structure as shown in, for example, FIG. 1. The burner has a center pipe 1 of which the outer circumference is surrounded by a first annular pipe 3, the outer circumference of the first annular pipe 3 being surrounded by a second annular pipe 5.

That is, the fine dry silica particles of the present invention are produced by using a siloxane compound without containing halogen in the molecules thereof as a silica source, feeding a mixed gas of a gas of the siloxane compound and an oxygen gas into the center pipe 1 of the burner, and feeding an auxiliary fuel gas containing a hydrogen gas or a hydrocarbon gas as a combustible component to the first annular pipe 3 of the burner.

In the above production method, the siloxane compound used as a silicon source of silica must be the one without containing halogen atoms. When the siloxane compound containing halogen atoms in the molecules thereof like a chlorosilane is used, halogen atoms remain in the silica that is obtained and may corrode metals, imposing limitation on the use of the silica. It further becomes difficult to maintain a sufficient degree of flame temperature at the time of combustion suppressing the growth of silica particles and making it difficult to obtain silica particles having particle sizes suited for the use as a filler for resins or as a toner additive.

There is no particular limitation on the siloxane compound without containing halogen in the molecules thereof used as a silicon source, and its examples include hexamethylcyclotrisiloxane, octamethylcyclotetrasiloxane, decamethylcyclopentasiloxane, hexamethyldisiloxane and octamethyltrisiloxane. Among them, it is desired to use a siloxane having a ratio (C/Si) of the number of carbon atoms and the number of silicon atoms contained in the molecules of not larger than 2 (i.e., cyclic siloxane). If the atomic ratio (C/Si) exceeds 2, the number of carbon atoms become too large relative to the silicon atoms resulting in an increase in the consumption oxygen in addition to its consumption for forming the fine silica particles. Therefore, carbon dioxide and the like are much by-produced generating the heat of combustion in large amounts, arousing a problem in that a step of a large scale is necessary for cooling the combusted gas and, therefore, bringing about disadvantage on the production on an industrial scale.

Further, the siloxane compound must have a high purity. If impurities are contained in large amounts, the obtained fine silica particles contain iron and the like in large amounts.

Further, the siloxane compound must be fed to the burner in a gaseous state. This, however, can be easily accomplished by heating and gasifying the siloxane compound. In this case, the siloxane compound having a low boiling point can be more easily heated and gasified. Among the above siloxane compounds, therefore, it is most desired to use the one having a boiling point of 100 to 250° C., such as hexamethylcyclotrisiloxane and octamethylcyclotetrasiloxane.

In gasifying the siloxane compound without containing halogen in the molecules thereof and feeding it to the burner, it is also allowable to use a carrier gas. As the carrier gas, there can be preferably used nitrogen, helium or argon.

In the present invention, the gas of the siloxane compound is fed in the form of a mixed gas with oxygen into the center pipe 1 of the burner described above and, at the same time, an auxiliary fuel gas containing hydrogen gas or hydrocarbon gas as a combustible component is fed to the first annular pipe 3 surrounding the center pipe 1 to execute the combustion, and the fine silica particles are obtained by the combustion.

Here, the properties of the obtained fine silica particles reflect the hysteresis of the fine silica particles in the flame. That is, the properties of the fine silica particles are very strongly affected by the flame structure at the time of combustion. To obtain the fine silica particles having the above-mentioned specific surface area and the optical absorbance $\tau$, therefore, the mixed gas fed to the center pipe 1 and the auxiliary fuel gas fed to the first annular pipe must satisfy the conditions described below.

First, the mixed gas fed to the center pipe 1 must contain the gas of the siloxane compound and the oxygen gas at an oxygen ratio $R_o$ defined by the following formula (2), $$R_o = A/B \tag{2}$$

wherein A is the amount of oxygen in the mixed gas, and B is the amount of oxygen necessary for completely burning the siloxane compound in the mixed gas, of 0.3 to 1.5 and, preferably, 1.0 to 1.5.

That is, when an octamethylcyclotetrasiloxane is used as the siloxane compound, the combustion is expressed by the following formula,

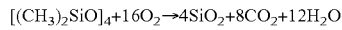
$$[(CH_3)_2SiO]_4 + 16O_2 \rightarrow 4SiO_2 + 8CO_2 + 12H_2O$$

To completely burn the siloxane compound, therefore, 16 mols of oxygen is necessary for one mol of the siloxane compound. Therefore, the mixed gas in this case must contain the oxygen gas in an amount of 4.8 to 24 mols and, particularly, 16 to 24 moles per one mol of the siloxane compound (octamethylcyclotetrasiloxane) so that the oxygen ratio $R_o$ lies in the above range.

That is, if the oxygen ratio $R_o$ is smaller than 0.3, the amount of oxygen in the mixed gas is small. Therefore, the siloxane compound reacts at an increased ratio with oxygen or air introduced from other than the center pipe 1 of the burner, or with oxygen contained in the atmosphere being mixed at the outlet of the burner, losing homogeneity in the flame that is related to the formation and growth of the fine silica particles. Namely, the obtained fine silica particles acquire a broad particle size distribution and the absorbance $\tau$ becomes high to no longer satisfy the formula (1). Therefore, the oxygen ratio $R_o$ must be set to be not less than 0.3. To maintain sufficient degree of homogeneity in the flame that is related to the formation and growth of fine silica particles, it is more desired to set the oxygen ratio to be not less than 1.0.

If the oxygen ratio $R_o$ is larger than 1.5, on the other hand, the homogeneity in the flame is maintained but the length of flame related to the growth of fine silica particles becomes too short causing the region where the fine silica particles grow to become narrow. Therefore, there is no time sufficient for the fine silica particles to collide together to become integral together; i.e., melt-adhered particles having poor dispersion increase in which particles are melt-adhered together, causing the absorbance $\tau$ to become high to no longer satisfy the condition of the formula (1).

In the present invention, therefore, the siloxane compound and the oxygen gas concentration in the mixed gas are so adjusted that the oxygen ratio $R_o$ lies in the range of 0.3 to 1.5, so that the obtained fine silica particles have an absorbance $\tau$ that satisfies the above formula (1) and have a specific surface area lying in the above range. To decrease the poorly dispersing melt-adhered particles while maintaining a sufficient degree of homogeneity of flame related to the formation and growth of fine silica particles, it is desired that the oxygen ratio $R_o$ is set to be 1.0 to 1.5.

The mixed gas may contain the above-mentioned carrier gas. In this case, too, the siloxane compound and the oxygen gas concentration in the mixed gas must be so adjusted that the oxygen ratio $R_o$ lies in the above range, as a matter of course.

In the present invention, further, the above mixed gas is fed into the center pipe 1 of the burner and, at the same time, the auxiliary fuel gas is fed into the first annular pipe 3 to effect the combustion. As the auxiliary fuel gas, a combustible gas containing a hydrogen gas or a hydrocarbon gas can be used. Concretely, there can be used a gas of hydrogen alone, a gas of hydrocarbon alone, a mixed gas of hydrogen and hydrocarbon, or a gas obtained by diluting the combustible gas with nitrogen. When incompletely burned, however, hydrocarbons generate carbon soot. It is therefore desired to use a gas without containing hydrocarbon as an auxiliary fuel gas.

In the present invention, the auxiliary fuel gas must be so fed that the auxiliary fuel ratio $R_{SFL}$ defined by the following formula (3), $$R_{SFL} = C/B' \tag{3}$$

wherein C is the amount of oxygen necessary for completely burning the combustible component in the auxiliary fuel gas flowing out of the first annular pipe, and B' is the amount of oxygen necessary for completely burning the siloxane compound in the mixed gas flowing out of the center pipe, is 0.003 to 0.3.

That is, referring to a case where the octamethylcyclotetrasiloxane is used as the siloxane compound, if the siloxane compound is blown out from the center pipe 1 at a rate of one mol per a unit time, the amount of oxygen necessary for completely burning the siloxane compound is 16 mols per the unit time. Therefore, the auxiliary fuel gas in this case must contain the combustible gas that is to be completely burned with oxygen in an amount of 0.048 to 4.8 mols per the unit time. Here, if hydrogen is used as the combustible gas, the combustion is expressed by the following formula, $$2H_2 + O_2 \rightarrow 2H_2O$$

Therefore, the auxiliary fuel gas must be so fed to the burner that hydrogen is blown out in an amount of 0.096 to 9.6 mols per the unit time.

In the present invention, if the auxiliary fuel ratio $R_{SFL}$ is not smaller than 0.3, oxygen mixed with the siloxane gas reacts in an increased amount with the combustible components in the auxiliary fuel gas, losing homogeneity of the flame that is related to the formation and growth of the fine silica particles. Namely, the obtained fine silica particles acquire a broad particle size distribution and the absorbance τ becomes high to no longer satisfy the formula (1). Further, if the auxiliary fuel ratio $R_{SFL}$ is not larger than 0.003, no flame is formed or flame cannot maintain stability if it is formed. As a result, the flame loses homogeneity, the particle size distribution becomes broad, and the absorbance τ no longer satisfies the condition of the above formula (1).

In the present invention, therefore, the fine silica particles having the above-mentioned properties are obtained by executing the combustion by blowing out the auxiliary fuel gas from the first annular pipe depending upon the amount of the siloxane compound in the mixed gas that is blown out, so that the auxiliary fuel ratio $R_{SFL}$ lies in the above range.

To produce fine silica powders by combustion by blowing out the mixed gas from the center pipe 1 and by blowing out the auxiliary fuel gas from the first annular pipe 3 as described above according to the present invention, use is made of a burner having a double-pipe structure comprising the center pipe 1 and the first annular pipe 3. As shown in FIG. 1, however, it is desired to use a burner of a triple-pipe structure further having a second annular pipe 5 on the outer side of the first annular pipe 3 to feed the oxygen gas as a combustion-sustaining gas from the second annular pipe 5. Upon feeding the combustion-sustaining gas (oxygen gas) from the outer side of the auxiliary fuel gas, it is made possible to suppress the auxiliary fuel from reacting with oxygen contained in the mixed gas, and the fine silica particles can be efficiently formed. This is further preferred from the standpoint of preventing a drop in the flame temperature due to the reaction of the auxiliary fuel with the air (external air) present on the outer side of the flame, avoiding an increase in the stuck particles and preventing the formation of fine silica particles having poor dispersion.

In the present invention, it is desired that the combustion-sustaining gas (oxygen gas) is so fed that the combustion-sustaining oxygen ratio $R_{cmbts}$ defined by the following formula, $$R_{cmbts} = D/B' \quad (4)$$

wherein D is the amount of oxygen flowing out of the second annular pipe, and B' is as defined above, is 0.1 to 2.0. That is, the combustion-sustaining oxygen ratio $R_{cmbts}$ is set in the same manner as the above auxiliary fuel ratio $R_{SFL}$. If the oxygen gas is fed from the second annular pipe 5 in a manner that the combustion-sustaining oxygen ratio $R_{cmbts}$ is larger than the above range, no particular effect is exhibited; i.e., the fine silica particles are formed in a small amount as compared to the amount of gas that is used, which is disadvantageous in economy. If the combustion-sustaining oxygen ratio $R_{cmbts}$ is smaller than the above range, on the other hand, the amount of the adhered particles increases whereby the molecular weight distribution of the fine silica particles becomes broad resulting in a decrease in the dispersion of the fine silica particles in the resin.

<Use of the Fine Silica Particles>

The fine dry silica particles of the present invention obtained as described above are preferably used as a filler for resins and as a toner additive for electrophotography. For example, the resin composition blended with the fine silica particles as a filler is particularly preferred for such uses as a sealing material for the semiconductors, as a sealing material for liquid crystal display and as an insulating material for the laminated boards. When used as a toner additive, the fine dry silica particles are usually externally added in an amount of 0.1 to 5 parts by weight per 100 parts by weight of the toner resin particles.

The fine dry silica particles of the invention can be directly added to the resin or may be externally added to the toner resin particles, or may further be used upon treating the surfaces thereof with a surface-treating agent.

As the surface-treating agent, there can be exemplified a silylating agent, a silicone oil, various silanes and various fatty acids, which, however, shall not contain halogen. Use of the surface-treating agent containing halogen spoils the advantage of the fine dry silica particles of the invention which are substantially free of halogen.

As the silylating agent, there can be exemplified alkoxysilanes such as tetramethoxysilane, methyltrimethoxysilane, dimethyldimethoxysilane, phenyltrimethoxysilane, diphenyldimethoxysilane, o-methylphenyltrimethoxysilane, p-methylphenyltrimethoxysilane, n-butyltrimethoxysilane, i-butyltrimethoxysilane, hexyltrimethoxysilane, octyltrimethoxysilane, decyltrimethoxysilane, dodecyltrimethoxysilane, tetraethoxysilane, methyltriethoxysilane, dimethyldiethoxysilane, phenyltriethoxysilane, diphenyldiethoxysilane, i-butyltriethoxysilane, decyltriethoxysilane, vinyltriethoxysilane, γ-methacryloxypropyltrimethoxysilane, γ-glycidoxypropyltrimethoxysilane, γ-glycidoxypropylmethyldimethoxysilane, γ-mercaptopropyltrimethoxysilane, γ-aminopropyltrimethoxysilane, γ-aminopropyltriethoxysilane, γ-(2-aminoethyl)aminopropyltrimethoxysilane, γ-(2-aminoethyl)aminopropylmethyldimethoxysilane; and silazanes such as hexamethyldisilazane, hexaethyldisilazane, hexapropyldisilazane, hexabutyldisilazane, hexapentyldisilazane, hexahexyldisilazane, hexaphenyldisilazane, divinyltetramethyldisilazane and dimethyltetravinyldisilazane.

As the silicone oil, there can be exemplified dimethylsilicone oil, methylhydrogensilicone oil, methylphenylsilicone oil, alkyl-modified silicone oil, carboxylic acid-modified silicone oil, fatty acid-modified silicone oil, polyether-modified silicone oil, alkoxy-modified silicone oil, carbinol-modified silicone oil, amino-modified silicone oil, and terminally reactive silicone oil.

As the siloxanes, there can be exemplified hexamethylcyclotrisiloxane, octamethylcyclotetrasiloxane, decamethylcyclopentasiloxane, hexamethyldisiloxane and octamethyltrisiloxane.

As the fatty acid, there can be exemplified long-chain fatty acids such as undecylic acid, lauric acid, tridecylic acid, dodecylic acid, myristic acid, palmitic acid, pentadecylic acid, steric acid, heptadecylic acid, arachic acid, montanic acid, oleic acid, linoleic acid, and arachidonic acid.

Further, the fine dry silica particles of the invention contain metal impurities such as iron and the like in small amounts, which is one of the advantages. When used for the applications where metal impurities do not affect, metal salts of the above fatty acids (e.g., salts of metals such as zinc, iron, magnesium, aluminum, calcium, sodium and lithium) and metal alkoxide can be used as surface treating agents.

As the metal alkoxide, there can be exemplified trimethoxyaluminum, triethoxyaluminum, tri-i-propoxyaluminum, tri-n-butoxyaluminum, tri-s-butoxyaluminum, tri-t-butoxyaluminum, mono-s-butoxydi-i-propylaluminum, tetramethoxytitanium, tetraethoxytitanium, tetra-i-propoxytitanium, tetra-n-propoxytitanium, tetra-n-butoxytitanium, tetra-s-butoxytitanium, tetra-t-butoxytitanium, tetraethoxyzirconium, tetra-i-propoxyzirconium, tetra-n-butoxyzirconium, dimethoxytin, diethoxytin, di-n-butoxytin, tetraethoxytin, tetra-i-propoxytin, tetra-n-butoxytin, diethoxyzinc, magnesium methoxide, magnesium ethoxide and magnesium isopropoxide.

When the fine dry silica particles of the invention are to be used as a toner additive, it is desired that the fine dry silica particles are treated to be hydrophobic by using the above-mentioned surface-treating agent and, particularly, hexamethylsilazane, dimethylsilicone oil, γ-aminopropyltriethoxysilane, or γ-(2-aminoethyl)aminopropylmethyldimethoxysilane.

The surfaces can be treated by any known method without limitation by using the surface-treating agent. For example, a generally employed method consists of spraying the surface-treating agent while stirring the fine dry silica particles or effecting the contact with vapor.

The surfaces may be treated by using the above surface-treating agent in a suitable amount to meet the use. When used as a toner additive, however, the surface-treating agent is used in an amount, suitably, in a range of 1 to 80 parts by weight per 100 parts by weight of the fine dry silica particles.

The fine dry silica particles of the invention are not limited to only those uses for sealing semiconductors, sealing liquid crystal display or as a resin composition for forming an insulating layer for the laminated boards or as a toner additive but can also be used for other uses alone or in combination with other particles. For example, the fine dry silica particles of the invention can be favorably used for quartz glass members such as quartz crucible, optical fibers and the like; polishing material such as CMP; adhesive such as photoreactive adhesive; cosmetics; filler for precision resin-molded articles; filler for dental materials; sealing agent for LEDs; carrier tape film for IC tape automated bonding; tape for fixing IC lead frames; coating layer for ink-jet papers; photosensitive material protection layer for electrophotography; photosensitive material cleaning material for electrophotography; various resins; additive for coating material such as delustering agent; anti-blocking agent; hard coating agent; and starting material for reflective molded articles.

EXAMPLES

The invention will now be described below concretely by way of Examples and Comparative Examples to which only, however, the invention is in no way limited.

In the following Examples and Comparative Examples, various properties were measured in compliance with the methods described below.

(1) Measurement of Specific Surface Areas:

Measured according to the nitrogen adsorption BET 1-point method by using an apparatus for measuring specific surface area (SA-1000) manufactured by Shibata Rikagaku Co.

(2) Measurement of Optical Absorbance:

An aqueous suspension of a silica concentration of 1.5% by weight was measured for its absorbance τ for light of a wavelength of 700 nm by using a spectrophotometer (V-530) manufactured by Nihon Bunkosha Co.

The sample cell to be measured was a synthetic quartz cell (having 5 clear surfaces, 10×10×45H) manufactured by Tokyo Garasu Kikaisha Co.

The aqueous suspension having a silica concentration of 1.5% by weight was prepared as described below.

0.3 Grams of the fine silica particles and 20 ml of distilled water were introduced into a sampling tubular bottle (manufactured by As-One Co., content of 30 ml, outer diameter of about 28 mm) which was so set in an ultrasonic wavehomogenizer (Sonifier II, Model 250D manufactured by Branson Co., probe: ¼ inches) in a manner that the lower surface of the probe tip was 15 mm under the water level, and the fine silica particles were dispersed in the distilled water under the conditions of an output of 25 W (amplitude 41%) and a dispersion time of 3 minutes.

(3) Determination of the Content of Coarse Particles by the Wet Sieving Using an Electroformed Sieve:

The wet sieving was conducted by using an electroformed sieve having a perforation size of 5 μm or 3 μm, and the residual amount on the sieve was determined. The sample to be measured was prepared by dispersing the fine silica particles in the distilled water by using an ultrasonic wave homogenizer (US-600T) manufactured by Nihon Seiki Seisakusho Co., under the conditions of an output graduate of 6 and a dispersion time of 3 minutes.

[Comparison of the Methods of Determining the Contents of Coarse Particles]

Mono-dispersed spherical silica particles of a particle size of 7.2±0.1 μm were added in a predetermined amount as coarse particles to the fine silica particles prepared in Example 1 that will be described later, and the thus mixed silica particles were measured for the amount of coarse particles by the wet sieving using an electroformed sieve having a perforation size of 5 μm.

Further, the above mixed silica particles were introduced into a container containing water, dispersed therein with ultrasonic waves, and were measured as an aqueous dispersion medium by using a laser diffraction/scatter particle size analyzer (LA-920) manufactured by Horiba Seisakusho Co., to determine the content of coarse particles of not smaller than 5 μm.

As will be understood from the results of the following Table 1 showing the contents of coarse particles determined by the above methods, the sensitivity for detecting coarse particles was low when the method of measuring the particle size distribution based on the laser diffraction/scattering method was used, and the amounts of coarse particles could not be determined on a ppm level.

TABLE 1

| Amount of coarse particles | Addition of 7.2 μm particles | ppm | 10 | 50 | 100 | 500 | 1000 | 10000 | 100000 |
|---|---|---|---|---|---|---|---|---|---|
| | Residual amount on 5 μm electroformed sieve | ppm | 10 | 50 | 95 | 495 | 980 | * | * |
| | LA-920 (5 μm or larger) | ppm | 0 | 0 | 0 | 0 | 0 | 0 | 52000 |

* Amount of coarse particles was too large to be measured.

(4) Evaluation of Properties as a Resin Compound:

An epoxy resin compound was prepared as described below and was evaluated for its properties (viscosity, gap permeation, presence of voids).

(Preparation of the Epoxy Resin Compound)

An epoxy resin ERL-4221 manufactured by Dow Chemical Co. and fine silica particles prepared in Examples and in Comparative Examples were blended together at a ratio of 1:1 (weight ratio), and were kneaded by using a revolving planetary mixer (AR-250) manufactured by Thinky Co. under a condition of a stirring time of 3 minutes to prepare epoxy resin compound.

(Measurement of Viscosity)

Measured by using the Brookfield viscometer (DV-2+Viscometer, spindle: S51, manufactured by Brookfield Co.) under the conditions of a temperature of 25° C. and a spindle rotational speed of 3 rpm.

(Gap Permeability)

A gap of a width of 10 mm, a length of 50 mm and a gap size of 50 μm formed by a glass plate and a polyimide tape was maintained at a temperature of 90° C., and the epoxy resin compound was dripped onto one opening thereof to measure a distance that has permeated in 5 minutes.

(Presence of Voids)

After the epoxy resin compound has flown into the gap for measuring the gap permeability, the presence of voids was confirmed by eyes.

(5) Analysis of Impurities:

Elements such as iron, aluminum, chrome, nickel, sodium and chlorine were determined by the ICP emission spectrophotometry, atomic absorptiometric method and ion chromatography.

Examples 1 to 5, Comparative Examples 1 to 3

Fine silica particles were produced by burning the octamethylcyclotetrasiloxane using the triple-pipe burner as described below.

The heated and gasified octamethylcyclotetrasiloxane, oxygen and nitrogen were mixed together, and were introduced into the center pipe of the burner. Hydrogen was introduced as the auxiliary fuel gas into the first annular pipe neighboring the center pipe, and oxygen was introduced as the combustion-sustaining gas into the second annular pipe neighboring on the outer side thereof. The production conditions were as shown in Table 2 (in Example 5, the fine silica particles were produced under quite the same conditions as those of Example 1 but without introducing the combustion-sustaining gas into the second annular pipe).

Table 2 also shows specific surface areas S of the fine silica particles, residual amounts on the electroformed sieves of perforation sizes of 5 μm and 3 μm, optical absorbance absorbencies τ of aqueous suspensions of a silica concentration of 1.5% by weight for the light of a wavelength of 700 nm, and evaluated properties (viscosities, gap permeabilities, presence of voids) of the resin compounds. Table 3 shows the analytical results of the impurities.

Comparative Example 4

The commercially available fumed silica was measured in the same manner as described above to obtain results as shown in Tables 2 and 3.

TABLE 2

| | | | Ex. 1 | Ex. 2 | Ex. 3 | Ex. 4 | Ex. 5 | Comp. Ex. 1 | Comp. Ex. 2 | Comp. Ex. 3 | Comp. Ex. 4 |
|---|---|---|---|---|---|---|---|---|---|---|---|
| Production condition | $O_2$ ratio | — | 0.5 | 1 | 0.5 | 1 | 0.5 | 0 | 0.2 | 0.6 | — |
| | $O_2$ concentration | % | 40 | 80 | 20 | 40 | 40 | 0 | 10 | 70 | — |
| | $R_{SFL}$ | — | 0.2 | 0.2 | 0.2 | 0.2 | 0.2 | 2.3 | 0.2 | 0.5 | — |
| | $R_{cmbts}$ | — | 0.8 | 0.8 | 0.8 | 0.8 | 0 | 0.8 | 0.8 | 0.8 | 0.8 |
| Silica properties | Specific surface areas S | m²/g | 30 | 30 | 50 | 50 | 25 | 30 | 50 | 30 | 50 |
| | Residual amount on 5 μm electroformed sieve | ppm | <5 | <5 | <5 | <5 | <5 | <5 | <5 | <5 | 110 |
| | Residual amount on 3 μm electroformed sieve | ppm | <5 | <5 | <5 | <5 | <5 | <5 | <5 | <5 | 200 |
| | Optical absorbance τ | — | 1.47 | 1.22 | 0.58 | 0.42 | 2.38 | 2.63 | 0.98 | 2.08 | 1.71 |
| | F(S) | — | 1.98 | 1.98 | 0.93 | 0.93 | 2.58 | 1.98 | 0.93 | 1.98 | 0.93 |

TABLE 2-continued

|  |  | Ex. 1 | Ex. 2 | Ex. 3 | Ex. 4 | Ex. 5 | Comp. Ex. 1 | Comp. Ex. 2 | Comp. Ex. 3 | Comp. Ex. 4 |
|---|---|---|---|---|---|---|---|---|---|---|
| Viscosity | mPa·s | 5200 | 4800 | 7500 | 7100 | 8000 | 9800 | 12600 | 8100 | * |
| Gap permeability | mm | 25 | 25 | 20 | 20 | 20 | 15 | 10 | 15 | 5 |
| Presence of voids |  | no | no | no | no | no | no | no | no | yes |

Note:
$R_{SFL}$ = aux. fuel ratio, $R_{cmbts}$ = combustion-substaining $O_2$ ratio, $F(S) = 240S^{-1.4} - 0.07$
* Viscosity was too large to be measured.

TABLE 3

|  |  |  | Ex. 1 | Ex. 2 | Ex. 3 | Ex. 4 | Ex. 5 | Comp. Ex. 1 | Comp. Ex. 2 | Comp. Ex. 3 | Comp. Ex. 4 |
|---|---|---|---|---|---|---|---|---|---|---|---|
| Kinds and amounts of impurity elements | Fe | ppm | <20 | <20 | <20 | <20 | <20 | <20 | <20 | <20 | <20 |
|  | Al | ppm | <5 | <5 | <5 | <5 | <5 | <5 | <5 | <5 | <5 |
|  | Ni | ppm | <5 | <5 | <5 | <5 | <5 | <5 | <5 | <5 | <5 |
|  | Cr | ppm | <5 | <5 | <5 | <5 | <5 | <5 | <5 | <5 | <5 |
|  | Na | ppm | <3 | <3 | <3 | <3 | <3 | <3 | <3 | <3 | <3 |
|  | Cl | ppm | <3 | <3 | <3 | <3 | <3 | <3 | <3 | <3 | 50 |

<Applied Example>

The fine silica particles obtained in the above Examples and Comparative Examples were evaluated for their properties (picture properties, cleaning properties) as toner additives for electrophotography according to the methods described below.

First, the fine silica particles obtained in Examples and in Comparative Examples were introduced into a mixer, stirred, purged with a nitrogen atmosphere and, at the same time, were heated at 250° C. Thereafter, the mixer was sealed, 20 parts by weight of a hexamethyldisilazane was sprayed onto 100 parts by weight of the fine silica particles which were, then, stirred for 30 minutes so as to become hydrophobic. The fine silica particles which were thus treated to be hydrophobic were evaluated for picture properties and cleaning properties to obtain results as shown in Table 4.

Picture Properties:

A toner composition was prepared by adding 1% by weight of the fine silica particles treated to be hydrophobic as described above to the toner resin particles having an average particle size of 7 μm, and stirring and mixing them together. By using the above toner composition, 30,000 pieces of copies were taken using a copier placed in the market (using an organic photosensitive material drum), and the picture density, fogging and the like were observed by eyes and evaluated. The evaluation was made on the following basis.

⊚: Picture is very good.
○: Picture is good.
Δ: Picture density is slightly low, fogging occurs slightly.
X: Picture density is low, fogging occurs, and shading occurs on the picture.

Cleaning Property:

After the picture properties have been evaluated, the scars on the surface of the organic photosensitive material drum of the copier, occurrence of sticking of the residual toner and effect on the formed picture were evaluated by eyes. The evaluation was made on the following basis.

⊚: Neither the occurrence of scars nor the adhesion of the residual toner is observed.

○: Scars are recognized to a small extent but the picture is not affected.

Δ: The residual toner and scars are recognized but the picture is affected little.

X: The amount of residual toner is considerably large, and longitudinal stripe-like defects occur on the picture.

XX: The residual toner adheres and defects occur much on the picture.

TABLE 4

Properties of toner additives.

|  | Ex. 1 | Ex. 2 | Ex. 3 | Ex. 4 | Ex. 5 | Comp. Ex. 1 | Comp. Ex. 2 | Comp. Ex. 3 | Comp. Ex. 4 |
|---|---|---|---|---|---|---|---|---|---|
| Picture properties | ○ | ⊚ | ○ | ⊚ | ○ | Δ | Δ | Δ | X |
| Cleaning properties | ○ | ⊚ | ○ | ⊚ | ○ | X | Δ | Δ | X |

The invention claimed is:

1. Fine dry silica particles obtained by an inter-flame reaction of a siloxane compound without containing halogen in the molecules thereof, and having a BET specific surface area of 20 to 55 m²/g, wherein the water suspension containing said fine silica particles at a concentration of 1.5% by weight has an optical absorbance τ for light of a wavelength of 700 nm satisfying the following formula (1):

$$\tau \leq 240S^{-1.4} - 0.07 \quad (1)$$

wherein S is the BET specific surface area (m²/g) of the fine dry silica particles, wherein said find dry silica particles have an iron content of less than 20 ppm, an aluminum content of less than 5 ppm, a nickel content of less than 5 ppm, a chromium content of less than 5ppm, a sodium content of less than 3 ppm and a chlorine content of less than 3 ppm.

2. Fine dry silica particles according to claim 1, wherein a residual amount of the fine silica particles on a sieve is not larger than 10 ppm relying on a wet sieving method using an electroformed sieve having a perforation size of 5 μm.

3. Fine dry silica particles according to claim 2, wherein a residual amount of the fine silica particles on a sieve is not larger than 10 ppm relying on the wet sieving method using an electroformed sieve having a perforation size of 3 μm.

4. A method of producing fine dry silica particles according to claim 1 by combustion by using a burner of a multiple-pipe structure having a center pipe and a surrounding first annular pipe, feeding a mixed gas of a gas of a siloxane compound without containing halogen in the molecules thereof and an oxygen gas into the center pipe of the burner, and feeding an auxiliary fuel gas containing a hydrogen gas or a hydrocarbon gas as a combustible component to the first annular pipe of the burner, wherein the mixed gas contains the gas of the siloxane compound and the oxygen gas at an oxygen ratio $R_o$ defined by the following formula (2), $$R_o = A/B \tag{2}$$

wherein A is the amount of oxygen in said mixed gas, and B is the amount of oxygen necessary for completely burning the siloxane compound in said mixed gas, of 0.3 to 1.5, and said auxiliary fuel gas is so fed that the auxiliary fuel ratio $R_{SFL}$ defined by the following formula (3), $$R_{SFL} = C/B' \tag{3}$$

wherein C is the amount of oxygen necessary for completely burning the combustible component in the auxiliary fuel gas flowing out of the first annular pipe, and B' is the amount of oxygen necessary for completely burning the siloxane compound in said mixed gas flowing out of the center pipe, is 0.003 to 0.3.

5. The method of producing fine dry silica particles according to claim 4, wherein said burner has a triple-pipe structure having a second annular pipe surrounding the outer circumference of the first annular pipe, and an oxygen gas is fed as a combustion-sustaining gas into said second annular pipe.

6. The method of producing fine dry silica particles according to claim 5, wherein said combustion-sustaining gas is so fed that the combustion-sustaining oxygen ratio $R_{cmbts}$ defined by the following formula (4), $$R_{cmbts} = D/B' \tag{4}$$

wherein D is the amount of oxygen flowing out of the second annular pipe, and B' is as defined above, is 0.1 to 2.0.

7. The method of producing fine dry silica particles according to claim 4, wherein said mixed gas contains the gas of the siloxane compound and the oxygen gas at such a ratio that said oxygen ratio $R_o$ is 1.0 to 1.5.

8. The method of producing fine dry silica particles according to claim 4, wherein hydrogen is used as the auxiliary fuel gas.

9. The method of producing fine dry silica particles according to claim 4, wherein said siloxane compound that is used has a boiling point of 100 to 250° C.

10. A resin compound containing the fine dry silica particles of claim 1.

11. A toner additive for electrophotography comprising the fine dry silica particles of claim 1.

* * * * *